United States Patent
Horlacher et al.

(10) Patent No.: US 9,386,785 B2
(45) Date of Patent: Jul. 12, 2016

(54) EXTRUDED COMPOSITIONS SUITABLE FOR USE IN FOOD PRODUCTS AND PROCESSES OF MAKING THEREOF

(75) Inventors: Peter Horlacher, Bellenberg (DE); Hartmut Gölitz, Wolfertschwenden (DE); Andreas Funke, Dietenheim (DE); Wolfgang Adams, Meckenbeuren (DE); Friedrich Kielmeyer, Illertissen (DE); Ingo Tralles, Illertissen (DE)

(73) Assignee: Cognis IP Management GmbH, Düsseldorf (DE)

( * ) Notice: Subject to any disclaimer, the term of this patent is extended or adjusted under 35 U.S.C. 154(b) by 431 days.

(21) Appl. No.: 12/096,691
(22) PCT Filed: Dec. 4, 2006
(86) PCT No.: PCT/EP2006/011601
§ 371 (c)(1),
(2), (4) Date: Jun. 9, 2008
(87) PCT Pub. No.: WO2007/076911
PCT Pub. Date: Jul. 12, 2007

(65) Prior Publication Data
US 2008/0317937 A1 Dec. 25, 2008

(30) Foreign Application Priority Data
Dec. 13, 2005 (DE) .................. 10 2005 059 406

(51) Int. Cl.
*A23L 1/00* (2006.01)
*A23L 1/0522* (2006.01)
*A21D 2/14* (2006.01)
*A21D 2/16* (2006.01)
(Continued)

(52) U.S. Cl.
CPC ............... *A23L 1/0522* (2013.01); *A21D 2/145* (2013.01); *A21D 2/16* (2013.01); *A21D 2/186* (2013.01); *A23L 1/0088* (2013.01); *A23L 1/035* (2013.01)

(58) Field of Classification Search
CPC .................................. A23J 3/00; A23L 1/025
USPC .......................... 426/516, 656, 531, 661, 665
See application file for complete search history.

(56) References Cited

U.S. PATENT DOCUMENTS

| | | | |
|---|---|---|---|
| 3,924,018 A | 12/1975 | Sims et al. | |
| 5,505,982 A | 4/1996 | Krawczyk et al. | |

(Continued)

FOREIGN PATENT DOCUMENTS

| | | | |
|---|---|---|---|
| EP | 0 153 870 A1 | 9/1985 | |
| EP | 0 650 669 A1 | 5/1995 | |

(Continued)

OTHER PUBLICATIONS

JP 2000/316504 Abstract and Machine Translation, 14 pgs.

*Primary Examiner* — Erik Kashnikow
*Assistant Examiner* — Preston Smith
(74) *Attorney, Agent, or Firm* — Knobbe, Martens, Olson & Bear, LLP

(57) ABSTRACT

A process for the extrusion of a composition from an extruder, which composition is suitable for use in a food product, is disclosed. The process provides a composition which is comprised of a hydrophilicized carrier and surface-active compound which is extruded. The process describes adding the surface-active compound after the carrier is hydrophilicized.

17 Claims, 2 Drawing Sheets

(51) Int. Cl.
*A21D 2/18* (2006.01)
*A23L 1/035* (2006.01)

(56) References Cited

U.S. PATENT DOCUMENTS 6,051,267 A * 4/2000 Jury et al. .................... 426/516
6,565,909 B1 * 5/2003 Huang et al. ................. 426/572
7,165,878 B1 * 1/2007 Mimran ..................... 366/177.1
2006/0121174 A1 * 6/2006 Franke ........................ 426/611

FOREIGN PATENT DOCUMENTS

| JP | 61/047162 | 3/1986 |
| JP | 2000/316504 | 11/2000 |
| WO | WO-85/03846 | 9/1985 |
| WO | WO 02/34052 A2 | 5/2002 |

* cited by examiner

EXTRUDED COMPOSITIONS SUITABLE FOR USE IN FOOD PRODUCTS AND PROCESSES OF MAKING THEREOF

CROSS-REFERENCE TO RELATED APPLICATIONS

This application claims priority under 35 U.S.C. Section 119 of German Application No. 102005059406.9 filed Dec. 13, 2005 and International Application No. PCT/EP2006/011601 filed Dec. 4, 2006, the contents of which are incorporated by reference herein in their entireties.

FIELD OF THE INVENTION

This invention relates to an extrusion process for the production of emulsifier-containing starting products for foods.

BACKGROUND OF THE INVENTION

In the production of foods nowadays, mixtures of food additives are often used and are incorporated—generally as semifinished products—in another mixture of ingredients and then further processed. Corresponding compositions make the work involved easier and lead to greater safety of production because the need for weighing and mixing is eliminated. The production of these preliminary products often results in mixtures which, despite the same chemical composition, behave very differently during further processing, depending on the process used for their production. Thus, not only the chemical composition and certain physicochemical properties, but also the production processes, have a major bearing on the properties of the final formulations in which these preliminary mixtures are used.

European patent EP 0 153 870 B1 (Nexus) describes preparations in the form of free-flowing powders of a carrier with a lipophilic surface-active substance which are preferably used for the production of baking compositions. The lipophilic surface-active substance acquires far better wettability as a result of processing with a carrier. A composition normally produced by spray drying was thus produced for the first time by a more economical and simpler extrusion process and was distinguished by improved behavior of the baking doughs subsequently produced.

In a so-called whipping test, in which the dough is beaten and as much air as possible is intended to be stably incorporated in order to obtain a light, fluffy product after baking, the product according to the invention showed clear advantages over conventional products.

Nevertheless, there is a need to improve the properties of emulsifier-containing ingredients for the production of foods and particularly confectionery. The production process ought to be able to be carried out in a simple manner. The extruded surface-active substances desirably exhibit improved properties in regard to their foaming capacity and stability which would be reflected in the end products obtained.

BRIEF SUMMARY OF THE INVENTION

The present invention is directed to a process for the production of extruded compositions suitable for use in a food product, in which a carrier is hydrophilicized by addition of a hydrophilic agent, and a surface-active compound is subsequently added in another step to the hydrophilicized carrier to form compositions which are then extruded.

The present invention is further directed to a process for the extrusion of a composition from an extruder containing at least one surface-active compound and at least one hydrophilicized carrier, which process comprises:
a) providing a carrier which is suitable for use in a food product;
b) hydrophilicizing the carrier by adding a hydrophilicizing agent to form a hydrophilicized carrier;
c) adding a surface-active compound to form a composition which comprises the hydrophilicized carrier and the surface-active compound; and
d) extruding the composition;
wherein the surface-active compound is added after the hydrophilicized carrier is formed.

This can be achieved by way of two different embodiments of the process of the invention. Either the carrier can be mixed with the hydrophilic agent before the beginning of extrusion and the resulting mixture fed to the extruder (for example as shown in FIG. 1) or hydrophilic agents are added to the carrier in the extruder and the surface-active compounds to be extruded are added afterwards as the extrusion process continues (for example as shown in FIG. 2). In a preferred embodiment, there is no intensive contact between the hydrophilic agents and the surface-active compounds, and the hydrophilic agents are added for hydrophilicizing the carrier before more surface-active compound is added.

Figure 1:
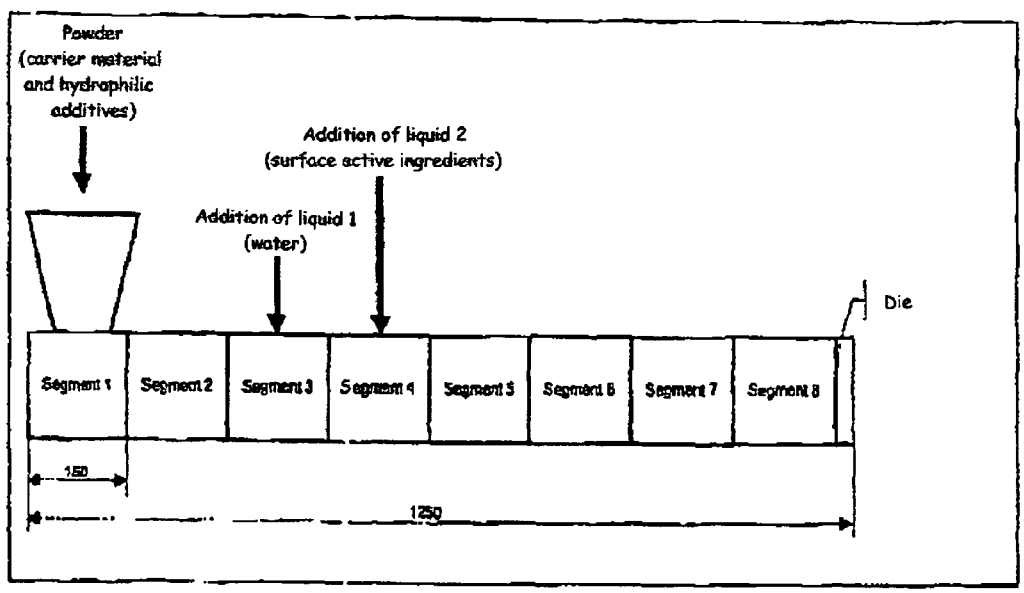
FIG. 1 illustrates one embodiment of the extrusion process. Here, in the process according to the invention, the carrier added to segment 1 can already be hydrophilicized by mixing with a hydrophilicizing agent prior to addition to the extruder.
Figure 2:
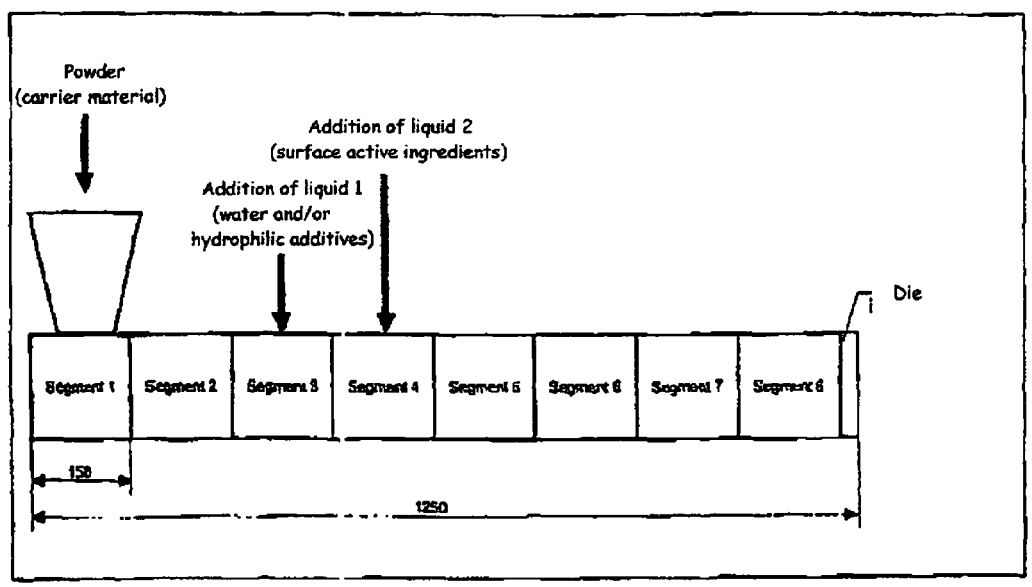
FIG. 2 illustrates another embodiment of the extrusion process. Here, the carrier is hydrophilicized by addition to segment 3 of the extruder containing a hydrophilicizing agent.

It has surprisingly been found that the extruded compositions obtainable by the process according to the invention not only show very good stability in storage, wettability and flow properties, they also have improved applicational properties, such as foaming capacity and stability in paste form, in relation to comparable commercially available powder-form products. The preliminary hydrophilicization leads to a modified structure or to a modified incorporation of the surface-active substances and hence to improved availability of the surface-active compound. This favorably influences the foaming process during production of the paste and desirably results in confectionery items with a loose and more stable structure.

Although the process may comprise another step, this does not complicate production and, in the second embodiment, the process can still be carried out as a "one-pot process". The results obtained in trials demonstrated that the extrusion process produced very constant results with respect to the properties of the extruded compositions.

DETAILED DESCRIPTION OF THE INVENTION

Carriers

The carriers according to the invention suitable for the extrudate of surface-active substances are the typical components or fillers used in the food industry. These generally include such substances as the flours or starches used in the production of confectionery (for example wheat starch, corn starch, rice starch, potato starch), modified starches, cellulose or cellulose derivatives and other carbohydrates, such as for example, sucrose, glucose, fructose, lactose, dextrins, maltodextrins, sugar alcohols, and malt-derived substances (for example malt flours, malt extracts), yeast food, soya products, such as soya flours, soya proteins, thickeners and hydrocolloids (including guar gum, cereal flour, carob gum, xanthan, alginate), milk products, such as skimmed milk powder, whole milk powder, whey powder, caseins, and mixtures thereof, this description being by no means complete, or limiting of the scope of carriers suitable for use in the invention.

Starches and flours are preferably used for the production of confectionery.

Hydrophilicizing Agents

Suitable emulsifiers which may be used as hydrophilicizing agents for the carrier may be used in amounts of from about 0.03 to 10% by weight, and preferably in amounts of from about 0.1 to 5% by weight, based on the weight of the extrudate.

Basically, the hydrophilicizing agent may have an HLB value above 8 and preferably above 12.

The emulsifiers may include in particular:
(a) sorbitan esters;
(b) polysorbates, i.e. products of the addition of 1 to 20 mol ethylene oxide onto sorbitan mono-, sesqui-, di- and/or triesters based on fatty acids containing 6 to 22, and preferably 12 to 18 carbon atoms, such as for example addition products of 5 to 15 mol ethylene oxide onto sorbitan monolaurate, sorbitan dipalmitate, sorbitan tristearate, sorbitan monooleate and the like;
(c) sugar esters, such as sucrose esters, for example sucrose monopalmitate and stearate;
(d) fatty acids and salts thereof; and
(e) partial esters of glycerol with edible fatty acids condensed with about 1 to 40 mol ethylene oxide.

Surface-Active Compounds

The surface-active compounds processed to extrudates for the production of foods are different from the hydrophilicizing agent (hydrophilic emulsifier) and, preferably, have lower HLB values.

Surface-active compounds typically used in food production may include in particular (individually or in combination):
(a) polyol esters;
(b) polyhydrols;
(c) mono- and diglycerides and technical mixtures thereof based on fatty acids containing 6 to 22, and preferably 12 to 18 carbon atoms, such as for example lauric acid monoglyceride, palmitic acid monoglyceride, stearic acid monoglyceride or oleic acid monoglyceride;
(d) lecithins;
(e) propylene glycol esters; and
(f) esterified monoglycerides (acetems, lactams).

Extrusion Process

In an extruder, dry or paste-form materials are transported forwards by a rotating screw and, in the process, are mixed, size-reduced, compressed and plasticized, and extruded through an end piece. The more or less dry starting materials are delivered via gravimetric or volumetric dosing units to the main part of the extruder. In this part of the extruder, one or two screws rotate in a hollow cylinder. The dosing/charging of the compactor can be influenced through the rotational speed of the screw(s).

Depending on the shearing energy applied, the screw mixes and heats the substances relatively intensively or non-intensively (through mechanical shearing and friction). A pumpable paste is thus formed and is forced through a nozzle and finely atomized.

The extrusion process is carried out at a nozzle temperature of from about 50 to 150° C., and preferably about 130° C.

The advantages of the invention are achieved by way of the addition of the hydrophilicizing agent to the carrier materials before addition of the surface-active substances. This can be done in a separate, preceding process step or may be integrated into the extrusion process. In either case, hydrophilicization of the carrier is conducted prior to the addition of the surface-active substances.

The following examples are illustrative of the invention and should not be construed as limiting of the scope of the invention.

EXAMPLES

Extrusion Process

Extruder: Werner & Pfleiderer ZSK 40 twin-screw extruder, Brabender gravimetric dosing system.

TABLE 1

Screw Configuration for W&P ZSK 40

| Element Helix angle/ length [mm] | Task | Length [mm] | |
| --- | --- | --- | --- |
| 25/25 | Filling | 25 | |
| 25/25 | | 50 | |
| 40/10 | | 60 | Starch |
| Disk/1 | | 61 | Starch |
| 60/60 | | 121 | Starch |
| 60/60 | | 181 | Starch |
| 988/30 | | 211 | Starch |
| 40/40 | | 251 | Starch |
| 40/40 | | 291 | Starch |
| 40/40 | | 331 | Starch |
| 40/40 | | 371 | Starch |
| 40/20 | Filling | 391 | Starch + water/solution |
| 40/40 | | 431 | Starch + water/solution |
| KB 45/5/40 | Mixing | 471 | Starch + water/solution |
| 40/40 | | 511 | Starch + water/solution |
| KB 45/5/20 | | 531 | Starch + water/solution |
| 40/40 | Trans- | 571 | Starch + water/solution |
| Disk/1 | port | 572 | Starch + water/solution |
| Disk/1 | | 573 | Starch + water/solution |
| 60/60 | Filling | 633 | Starch + water/solution + emulsifier |
| Disk/1 | Trans- | 634 | Starch + water/solution + emulsifier |
| 40/40 | port | 674 | Starch + water/solution + emulsifier |
| 40/10 | | 684 | Starch + water/solution + emulsifier |
| KB 45/5/20 | Mixing, | 704 | Starch + water/solution + emulsifier |
| KB 45/5/20 | trans- | 724 | Starch + water/solution + emulsifier |
| 40/40 | port | 764 | Starch + water/solution + emulsifier |
| 40/10 | | 774 | Starch + water/solution + emulsifier |
| 40/10 | | 784 | Starch + water/solution + emulsifier |
| KB 45/5/40 | | 824 | Starch + water/solution + emulsifier |
| 40/10 | | 834 | Starch + water/solution + emulsifier |
| 40/10 | | 844 | Starch + water/solution + emulsifier |
| 40/20 | | 864 | Starch + water/solution + emulsifier |
| 40/10 | | 874 | Starch + water/solution + emulsifier |
| 40/10 | | 884 | Starch + water/solution + emulsifier |
| KB 90/5/40 | Mixing | 924 | Starch + water/solution + emulsifier |
| 40/40 | Trans- | 964 | Starch + water/solution + emulsifier |
| 40/40 | port | 1004 | Starch + water/solution + emulsifier |
| 40/40 | and | 1044 | Starch + water/solution + emulsifier |
| 25/25 | compres- | 1069 | Starch + water/solution + emulsifier |
| 25/25 | sion | 1094 | Starch + water/solution + emulsifier |
| 40/10 | | 1104 | Starch + water/solution + emulsifier |
| 40/10 | | 1114 | Starch + water/solution + emulsifier |
| E 40/80 | | 1194 | Starch + water/solution + emulsifier |

Powder dosage: 21 kg/h segment 1
Surface-active substances: mixture of a polyglycerol ester of fatty acids (FDA-CFR-No. 172.854, EEC No. 475; Polymuls) and mono- and diglycerides of edible fatty acids (EEC No. E 471: Monomuls 90-35)
Dosage: 8.9 kg/h in segment 4

Water dosage: 0.9 kg/h (+0.4 kg/h hydrophilic additives) in segment 3
Die plate: 4×1 mm
Screw speed: 200 r.p.m
Temperatures: segment 1: room temperature
  segments 2-7: 80° C.
  segment 8: 130° C.

Example 1

A native starch (Remy D R, Remy Industries, Belgium) was mixed with 5% by weight of a powder-form hydrophilic emulsifier (potassium stearate, LIGA Kaliumstearat V pflanziich, Peter Greven Fett-Chemie GmbH & Co. KG, Germany) and the resulting mixture was used in the above-described extrusion process.

For comparison, the process was carried out without addition of the hydrophilic powder-form emulsifier (corresponding to the process described by Nexus).

Example 2

A mixture of hydrophilic emulsifiers of 50% TWEEN 20 and 50% TWEEN 80 were 31.25% dissolved in water and added to the extrusion process between addition of the starch (corresponding to Example 1) and before addition of the surface-active substances.

For comparison, the process was carried out without addition of the hydrophilic emulsifiers in the water phase (corresponding to the process described by Nexus).
Whipping Test:

| Composition of the dough: | |
| --- | --- |
| Wheat flour (type 405) | 152 g (60%) |
| Wheat starch | 102 g (40%) |
| Cane sugar | 208 g (82%)[1] |
| Baking powder (standard "Eisella") | 10 g (4%)[1] |
| Extruded emulsifier | 28 g (11%)[1] |
| Egg | 250 g (100%)[1] |
| Water | 100 g (40%)[1] |

[1]based on flour, starch as 100%

All ingredients were mixed at room temperature and whipped in a Hobart N50G for 2 mins. 45 secs. at level 3 and for 30 secs. at level 2; and in a Hobart A200 for 6 mins. at level 3 and for 30 secs. at level 2. The density of the paste obtained was determined. The values obtained are shown in the following:
For Example 1
a) paste density with emulsifier based on native starch (Nexus process): 520 g/l;
b) paste density with emulsifier based on native starch mixed with potassium stearate: 320 µl; and
c) paste density with commercially available extruded emulsifier (Nexus), Emulpals 106, Batch No. 2909388: 384 g/l.
For Example 2
a) paste density with emulsifier based on native starch (Nexus process): 520 g/l;
b) paste density with emulsifier based on native starch and hydrophilic additives in water: 336 g/l; and
c) paste density with commercially available extruded emulsifier (Nexus), Emulpals 106, Batch No. 2909388: 384 g/l.
In Examples 1 and 2, the embodiments of the invention (b) demonstrated lower paste densities than those made by way of the prior art.

The invention claimed is:

1. A process for the extrusion of a composition from an extruder, which composition is suitable for use in a food product, which process comprises the steps of:
   (a) providing a carrier which is suitable for use in a food product;
   (b) hydrophilicizing said carrier by adding a hydrophilicizing agent and mixing or extruding to form a hydrophilicized carrier;
   (c) subsequently adding a surface-active compound to form a composition which comprises said hydrophilicized carrier and said surface-active compound, wherein said surface-active compound is added to said hydrophilicized carrier in an extruder and the composition is dry or paste-form; and
   (d) extruding said composition from said extruder, wherein the extruder mixes, size reduces, compresses and plasticizes;
   wherein said surface-active compound is added after the hydrophilicized carrier is formed; and
   wherein the extruded composition is added to a food product.

2. The process of claim 1 wherein said hydrophilicized carrier is formed prior to addition to the extruder.

3. The process of claim 1 wherein said hydrophilicized carrier is formed in the extruder.

4. The process of claim 1 wherein said carrier is selected from the group consisting of starches, modified starches, carbohydrates, proteins, flours and combinations thereof.

5. The process of claim 1 wherein said hydrophilicizing agent is selected from the group consisting of sorbitan esters, polysorbates, sugar esters, fatty acids, salts of fatty acids, partial esters of glycerol, and mixtures thereof.

6. The process of claim 5 wherein the said hydrophilicizing agent has an HLB value of greater than about 8.

7. The process of claim 6 wherein said HLB value is greater than about 12.

8. The process of claim 1 wherein said hydrophilicizing agent is present in an amount of about 0.03 to about 10% by weight, based on the weight of the carrier.

9. The process of claim 1, wherein extrusion is carried out at a nozzle temperature of about 50 to about 150° C.

10. The process of claim 8, wherein said hydrophilicizing agent is present in about 0.1 to about 5% by weight, based on the carrier.

11. The process of claim 1, wherein said surface-active compound is selected from the group consisting of polyol esters, polyols, monoglycerides, diglycerides, lecithins, propylene glycol esters, esterified monoglycerides, and mixtures thereof.

12. The process of claim 11, wherein said monoglycerides and diglycerides are esters of C6-C22 fatty acids.

13. The process of claim 12, wherein said monoglycerides are selected from the group consisting of lauric acid monoglyceride, palmitic acid monoglyceride, stearic acid monoglyceride and oleic acid monoglyceride.

14. The process of claim 1, wherein the extruder comprises a rotating screw to transport the composition forward through the extruder.

15. The process of claim 1, wherein extruding said composition from said extruder comprises forming a pumpable paste that is forced through a nozzle.

16. The process of claim 14, wherein the extruder comprises two or more segments along a length of the rotating screw.

17. The process of claim 16, wherein the hydrophilicized carrier is formed in a first segment and said surface-active compound is added in a second segment that is located after the first segment.

\* \* \* \* \*